(12) United States Patent
Liu et al.

(10) Patent No.: US 9,848,619 B2
(45) Date of Patent: Dec. 26, 2017

(54) CHEWING GUMS AND GUM BASES COMPRISING BLOCK COPOLYMERS HAVING CRYSTALLIZABLE HARD BLOCKS

(71) Applicant: WM. WRIGLEY JR. COMPANY, Chicago, IL (US)

(72) Inventors: Jingping Liu, Chicago, IL (US); Les Morgret, Chicago, IL (US); David Phillips, Chicago, IL (US); Rafael Bras, Evanston, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 255 days.

(21) Appl. No.: 14/420,632

(22) PCT Filed: Aug. 9, 2013

(86) PCT No.: PCT/US2013/054357
§ 371 (c)(1),
(2) Date: Feb. 9, 2015

(87) PCT Pub. No.: WO2014/026122
PCT Pub. Date: Feb. 13, 2014

(65) Prior Publication Data
US 2015/0216200 A1 Aug. 6, 2015

Related U.S. Application Data

(60) Provisional application No. 61/681,998, filed on Aug. 10, 2012, provisional application No. 61/805,912, filed on Mar. 27, 2013.

(51) Int. Cl.
*A23G 4/08* (2006.01)
*C08L 53/00* (2006.01)

(52) U.S. Cl.
CPC ............... *A23G 4/08* (2013.01); *C08L 53/00* (2013.01)

(58) Field of Classification Search
CPC ....................................................... A23G 4/08
See application file for complete search history.

(56) References Cited

U.S. PATENT DOCUMENTS

| | | | |
|---|---|---|---|
| 2,740,772 A | 4/1956 | Alfrey, Jr. | |
| 4,281,087 A * | 7/1981 | Heuschen | C08G 63/823 525/361 |
| 4,786,722 A | 11/1988 | Zehner | |
| 5,236,719 A | 8/1993 | Meyers et al. | |
| 5,286,501 A | 2/1994 | Song et al. | |
| 5,342,631 A | 8/1994 | Yatka et al. | |
| 5,397,579 A | 5/1995 | Yatka et al. | |
| 5,424,080 A | 6/1995 | Synosky et al. | |
| 5,431,929 A | 7/1995 | Yatka et al. | |
| 5,458,892 A | 10/1995 | Yatka et al. | |
| 5,672,367 A | 9/1997 | Grijpma et al. | |
| 6,511,679 B2 | 1/2003 | D'Amelia et al. | |
| 6,613,363 B1 | 9/2003 | Li | |
| 7,833,555 B2 | 11/2010 | Andersen et al. | |
| 8,211,980 B2 | 7/2012 | Cosgrove et al. | |
| 8,293,295 B2 | 10/2012 | Andersen et al. | |
| 8,591,967 B2 | 11/2013 | Andersen et al. | |
| 2004/0180111 A1 | 9/2004 | Andersen et al. | |
| 2005/0244538 A1 | 11/2005 | Anderson et al. | |
| 2006/0240144 A1 | 10/2006 | Shalaby et al. | |
| 2007/0104829 A1 | 5/2007 | Soper et al. | |
| 2007/0154591 A1 | 7/2007 | Andersen | |
| 2007/0172541 A1 | 7/2007 | Donaire et al. | |
| 2008/0057153 A1 | 3/2008 | Cosgrove et al. | |
| 2008/0063609 A1 | 3/2008 | Nissen | |
| 2008/0107770 A1 | 5/2008 | Wittorff et al. | |
| 2008/0166448 A1 | 7/2008 | Wittorff et al. | |
| 2008/0260900 A1 | 10/2008 | Wittorff et al. | |
| 2009/0130250 A1 | 5/2009 | Andersen et al. | |
| 2009/0226383 A1 | 9/2009 | Andersen et al. | |
| 2009/0304857 A1 | 12/2009 | Neerguard | |
| 2010/0068339 A1 | 3/2010 | Neergaard | |
| 2010/0074987 A1 | 3/2010 | Neerguard | |
| 2010/0152410 A1 | 6/2010 | East et al. | |
| 2010/0159068 A1 | 6/2010 | Wittorff et al. | |

(Continued)

FOREIGN PATENT DOCUMENTS

EP 0123742 B1 11/1984
WO WO1992002149 A1 2/1992

(Continued)

OTHER PUBLICATIONS

Infuse™ 9807 Technical Information sheet. 2010.*
Arriola et al., "Catalytic Production of Olefin Block Copolymers via Chain Shuttling Polymerization," Science, May 5, 2006, vol. 312, pp. 714-719.
Batra et al., "Highly Oil-Extended Olefin Block Copolymers," ANTEC, 2009, pp. 855-859.
Batra et al., "Blends of Infuse Olefin Block Copolymers for Adhesion to Polar Substrates," ANTEC, 2009, pp. 1012-1016.
Breed et al., "Predicting the Near-Equilibrium Solubilities of Oils in Olefin Block Copolymers," ANTEC, 2011, pp. 1089-1093.
Environmental Advantages for Infuse by Dow from Dow Elastomers retrieved May 17, 2012 at http://www.globalspec.com/featuredProducts/detail?ExhibitId=200l0l&uid=%2D189009,1 page.
Hiltner et al., "Solid State Structure and Properties of Novel High Performance Olefin Elastomers," ANTEC, 2006, pp. 1000-1004.
Khariwala et al., "Crystallization kinetics of some new olefinic block copolymers," Polymer, 2008, vol. 49, pp. 1365-1375.
Khariwala et al., "Crystallization Kinetics of Olefinic Block Copolymers," ANTEC, 2007, pp. 1196-1200.

(Continued)

*Primary Examiner* — Nikki H. Dees

(57) ABSTRACT

Chewing gums and chewing gum bases which are cud-forming and chewable at mouth temperature contains a block copolymer having at least two hard crystallizable polymeric blocks and at least one soft polymeric block. At least one hard polymeric block is a hard crystallizable polymeric block has a melting point greater than 20° C. The hard, crystallizable polymeric blocks and the soft blocks each have a degree of polymerization of at least 15 Characteristics of the block copolymers can be selected to produce gum bases and chewing gums having desired properties. In some cases, chewed cuds formed from the gum bases may exhibit improved removability from environmental surfaces to which they may become undesirably attached.

14 Claims, 5 Drawing Sheets

(56) References Cited

U.S. PATENT DOCUMENTS

| | | | |
|---|---|---|---|
| 2010/0215799 A1 | 8/2010 | Cosgrove et al. | |
| 2010/0303954 A1 | 12/2010 | Donaire et al. | |
| 2011/0021103 A1* | 1/2011 | Alper | B32B 5/26 |
| | | | 442/329 |
| 2011/0111084 A1 | 5/2011 | Neergaard | |
| 2011/0123672 A1 | 11/2011 | Haas et al. | |
| 2012/0128980 A1 | 5/2012 | Xia et al. | |
| 2013/0045298 A1 | 2/2013 | Andersen et al. | |
| 2013/0052301 A1 | 2/2013 | Bunczek et al. | |
| 2014/0161931 A1 | 6/2014 | Haas et al. | |

FOREIGN PATENT DOCUMENTS

| | | |
|---|---|---|
| WO | WO1993006740 A1 | 4/1993 |
| WO | WO1993012665 A1 | 7/1993 |
| WO | WO2007076425 A1 | 7/2005 |
| WO | WO2008002337 A1 | 2/2008 |
| WO | WO2009124067 A1 | 3/2009 |
| WO | 2011031993 A2 | 3/2011 |
| WO | 2011032026 A2 | 3/2011 |
| WO | 2011032031 A1 | 3/2011 |
| WO | WO2011063338 A1 | 5/2011 |

OTHER PUBLICATIONS

Marchand et al., "Novel Olefin Block Copolymers," Plastics R&D, 2007, 4 pages.

Zuo et al., "An in Situ X-ray Structural Study of Olefin Block and Random Copolymers under Uniaxial Deformation," Macromolecules, 2010, vol. 43, pp. 1922-1929.

Hermel, T. J. et al., Role of Molecular Architecture in Mechanical Failure of Glassy/Semicrystalline Block Copolymers: CEC vs CECEC Lamellae, Macromolecules, American Chemical Society, vol. 36, pp. 2190-2193, 2003, USA.

Wu, L. et al., Consequences of Block Number on the ODT and Viscoelastic Properties of Linear (AB)n Multiblock Copolymers, Macromolecules, vol. 37, pp. 3360-3368, 2004, American Chemical Society, USA.

Cohn, D., Biodegradable Multiblock PEO/PLA TPEs Molecular Design and Properties, Polymer, Elsevier, vol. 46, pp. 2068-2075, 2005, USA.

Koo, C-M. et al., Structure and Properties of Semicrystalline—Rubbery Multiblock Copolymers, Macromolecules, American Chemical Society, vol. 39, pp. 667-677, 2006, USA.

Zeng, J-B. et al, A Novel Biodegradable Multiblock Poly(Ester Urethane) Containing Poly(l-Lactic Acid) and Poly (Butylene Succinate) Blocks, Elsevier, Polymer, vol. 50, pp. 1178-1186, 2009, USA.

Wang, H. P., Comparing Elastomeric Behavior of Block and Random Ethylene-Octene Copolymers, Journal of Applied Polymer Science, vol. 113, pp. 3236-3244, 2009, USA.

Moravek, S. et al., Seawater Degradable Thermoplastic Polyurethanes, Journal of Applied Polymer Science, Journal of Applied Polymer Science, vol. 115, pp. 1873-1880, 2010, USA.

Wu, J. et al., PEG-POSS Multiblock Polyurethanes: Synthesis, Characterization, and Hydrogel Formation, American Chemical Society, vol. 43, pp. 7637-7649, 2010, USA.

Hitachi, Application Brief DC Measurements of Polystyrene—The Effects of Molecular Weight on Glass transition, Hitachi High-Tech Science Corporation, TA No. 68, Aug. 1995, available at http://www.hitachi-hitec-science.com/en/documents/technology/thermal_analysis/application_TA_068e.pdf.

SEC of Homopolymer, Polystyrene Sample p. 4250-S, http://www.polymersource.com/dataSheet/P4250-S.pdf.

Holden, G. & Kricheldorf, H., Thermoplastic Elastomers, 3rd Edition, Hanser Publishing Company, pp. 15-43 and 453-520, 2004, Germany.

Feng Zuo et al., Effects of Block Architecture on Structure and Mechanical Properties of Olefin Block Copolymers under Uniaxial Deformation, Macromolecules, Apr. 8, 2011, pp. 3670-3673, vol. 44, ACS Publications.

Gary R. Marchand et al., Novel Olefin Block Copolymers, Plastics R&D, 2006, 4 pages, NA.

Kurt Swogger, Polyolefin Technology Recent Past and The Future, DOW, Feb. 2007, 34 pages, NA.

* cited by examiner

Atomic Force Microscopy phase images of gum bases with different crystalline block copolymer content Ex. 41

Ex. 39

Crystalline block copolymer

Microcrystal structure in the chewing gum matrix with polymeric network containing crystallizable BCP

CHEWING GUMS AND GUM BASES COMPRISING BLOCK COPOLYMERS HAVING CRYSTALLIZABLE HARD BLOCKS

PRIORITY DATA

The present patent application is a 371 of International Application No. PCT/US13/54357 filed Aug. 9, 2013, which claims benefit from U.S. Ser. Nos. 61/681,998 filed Aug. 10, 2012, and 61/805,912 filed Mar. 27, 2013. All of the patent applications listed above are incorporated by reference therefrom as if fully restated herein.

BACKGROUND OF THE INVENTION

The present invention relates to chewing gum. More specifically, this invention relates to improved formulations for chewing gum bases possessing such polymeric networks that microcrystalline domains act as network junctions and each junction is chemically bonded to an amorphous polymeric domains. The microcrystalline domains have melting point greater than 20° C. and the microcrystalline domain size is in the range of 0.01~100 μm. The amorphous polymer domains typically have glass transition temperatures less than 37° C. Preferably, gum bases with the above polymeric networks contain block copolymers having at least two different component polymeric blocks. In the present invention, the copolymer includes at least one soft polymeric block and at least two hard crystallizable polymeric blocks having a melting point greater than 20° C. Chewing gums prepared from the inventive gum bases may form cuds which have improved removability when attached to environmental surfaces.

SUMMARY OF THE INVENTION

This invention is directed to chewing gum bases that form polymeric networks having microcrystalline domains with melting points greater than 20° C. chemically bonded to amorphous polymer domains having glass transition temperatures less than 37° C. The bases typically comprise a block copolymer comprising at least one soft polymeric block and at least two hard, crystallizable polymeric blocks. In some embodiments, the hard, crystallizable polymeric blocks have a melting point greater than 20° C. In some embodiments, the length of uninterrupted polymeric blocks have a degree of polymerization at least 15 in both hard and soft blocks. In some embodiments, the polydispersity of crystallizable hard block is less than 7. In some embodiments, the block copolymer contains hard crystallizable polymeric blocks having greater than 50% crystalline domains by weight of the hard, crystallizable blocks when the polymer is maintained at a temperature of less than 20° C. for a period of one hour.

This invention further relates to the formulation and preparation of the above chewing gum bases.

In some embodiments, the invention is directed to a gum base comprising a block copolymer comprising at least one soft polymeric block and at least two hard, crystallizable polymeric blocks which are capable of forming microcrystalline domains upon being chewed and discarded. The microcrystalline domains have a size of from 0.01 microns to 100 microns. In some embodiments, the invention is directed to gum bases that, after chewing, form a microcrystalline polymeric network in the dried gum cud. In some embodiments, the microcrystalline content constitutes greater than 0.5%, or greater than 2%, or greater than 2.5% by weight of the dried cud. In some embodiments, the microcrystalline domain is composed of a linear polyolefin such as polyethylene. In some embodiments, the melting enthalpy of the crystalline solid joints in the dried cud is greater than 0.58 J/g or greater than 1 J/g, or greater than 2 J/g, or greater than 2.6 J/g.

In some embodiments, the microcrystalline domain is in the form of rodlets (fibrillar), platelets (discoid) or spheres (spherulitic). In some embodiments, the aspect ratio of the crystalline solid joints is in the range of 1 to 100, or in the range of 2 to 50.

In some embodiments, the size distribution of crystalline solid joints (polydispersity) is narrow. In some embodiments, the size polydispersity of the crystalline solid joints is less than 7 or less than 5 or less than 3. In some embodiments, the width of the melting peak of the crystalline block (as determined by DSC) at half height is in the range of 2 to 40° C. or 3 to 30° C. or 3 to 10° C.

In some embodiments, the molecular weight of the amorphous polymeric segment bonded to the microcrystalline domain, is in the range $10^3$ to $10^7$ g/mole; or $10^4$ to $10^6$ g/mole, or $2.5 \times 10^4$ to $3 \times 10^6$ g/mole.

In some embodiments, the apparent shear viscosity of chewing gum cuds containing gum bases of the present invention is $10^8$ Pa or higher (as measured by creep test) under near zero strain ($<10^{-5}$%) and apparent shear viscosity is higher than $10^8$ Pa*s (Pascal seconds) when shear strain is higher than 0.2% under constant shear stress higher than 40 Pa at 25° C.

DESCRIPTION OF THE INVENTION

Figure 1:
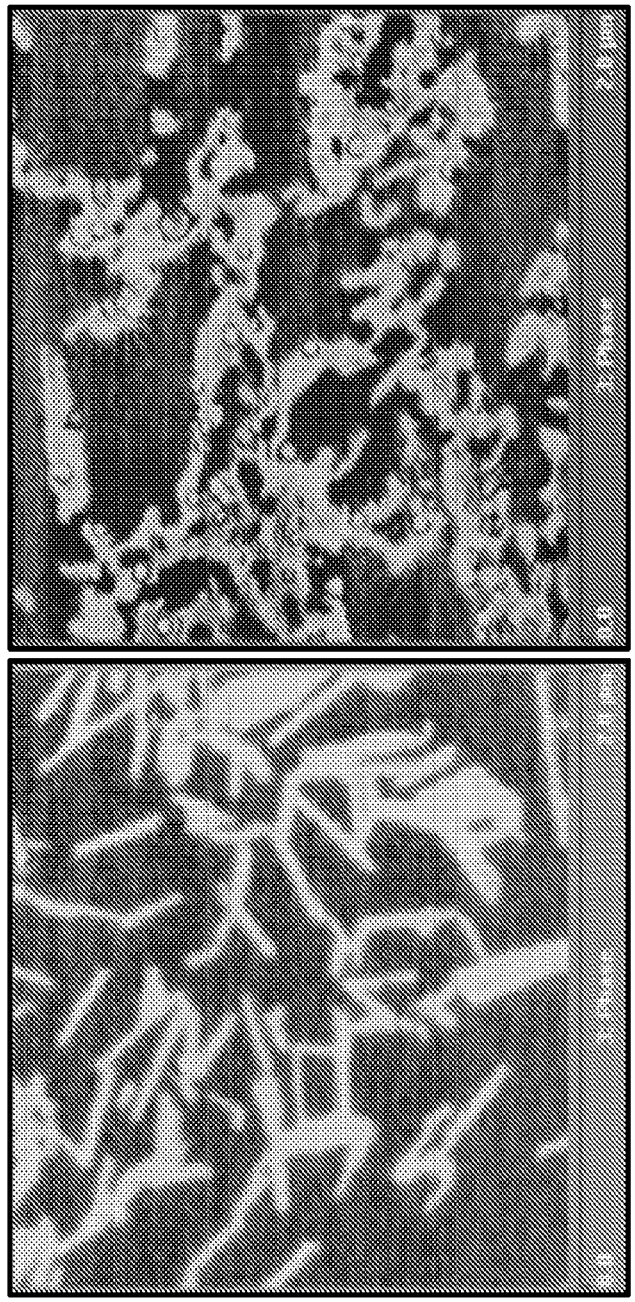
FIG. 1 shows Atomic Force Microscopy phase images of gum bases with different crystalline block copolymer content

The present invention provides improved chewing gum bases and chewing gums. In accordance with the present invention, novel chewing gum bases and chewing gums are provided that include polymeric networks with microcrystalline junctions (or joints) which are covalently bonded to amorphous polymer domains. The network can be formed by formulating at least one crystallizable block copolymer having at least two different polymeric blocks. By different polymeric blocks it is meant that the blocks are composed of chemically different monomers as opposed to identical monomers having different stereochemical configurations.

The presence of these hard, crystallizable blocks in the copolymer of the gum base, after chewing, produces a cud which may readily assume microstructures that resist flow into pores and crevices of rough environmental surfaces, thus making the cuds easier to remove when they become attached to such surfaces.

Conventional chewing gum bases typically consist of linear, amorphous polymers with glass transition temperatures near or below body temperature. Since glass transition is quasi-second order thermodynamic transition, the dimension of chewed gum cuds is a function of both time and temperature, which makes gum cuds behave like a slow-flowing viscous mass at ambient temperatures, causing the cud to flow into pores and crevices in environmental surfaces. This flow over time results in the development of an intimate contact area between the gum cud and the substrate during aging, which results in strong adhesion to the surface. Mechanical energy applied to the gum cud in an effort to remove it is dissipated on the way to the interface between gum cud and the substrate. This results in a higher apparent debonding energy.

Since the crystallization transition (crystallization/melting) is a first order thermodynamic transition, the dimensions of a crystalline material would not change with time, i.e. no intimate contact area is developed during aging. The mechanical energy dissipation within crystal material is minimal compared to an amorphous material above its glass transition temperature. Thus, a chewing gum base containing a high amount (>40%) of high melting point crystalline polymer such as low density polyethylene (LDPE) is easy to remove from a substrate. However, the crystalline homopolymer has a tendency to form large crystalline domains due to macrophase separation. When the firm crystalline domain is larger than 100 μm, the texture may be judged to be gritty during chewing. Thus, it is crucial to control both the polymeric crystalline domain size and distribution to create chewing gum with both good removability and acceptable sensory properties. The preferable crystalline domain size should be less than 100 microns but greater than 0.01 micron. Preferably, the crystalline domains are in the range of 0.03 to 1 micron.

Macrophase separation does not usually occur in block copolymers since the thermodynamic forces driving separation are counterbalanced by entropic forces from the covalent linkage. Even when the repulsion between unlike monomers is relatively weak, the repulsion between unlike sequences may be strong enough to cause microphase separation. Often the microdomains are not located randomly. Instead, they form a regular arrangement giving rise to a periodic structure (macrolattice).

When a block copolymer is composed of crystallizable blocks and amorphous blocks, it has been reported that lamellae in the crystalline layers pack in a monolayer (bilayer packing is not favored due to a higher free energy).

In some embodiments, the inventive gum bases will form microcrystalline domains of the preferred size range in cuds that are discarded after chewing. This occurs when the crystalline blocks of different polymer chains form a structure joining the chains into a matrix which resists flow. These joints can be considered a physical crosslinking of the polymers. It differs from covalent crosslinking in that the joints may be broken by heating or mechanical action (for example in mixing or chewing) and then reform when the cud is polymer mass is allowed to rest without mechanical agitation for a sufficient time at a temperature below the melting point ($T_m$).

Figure 6:
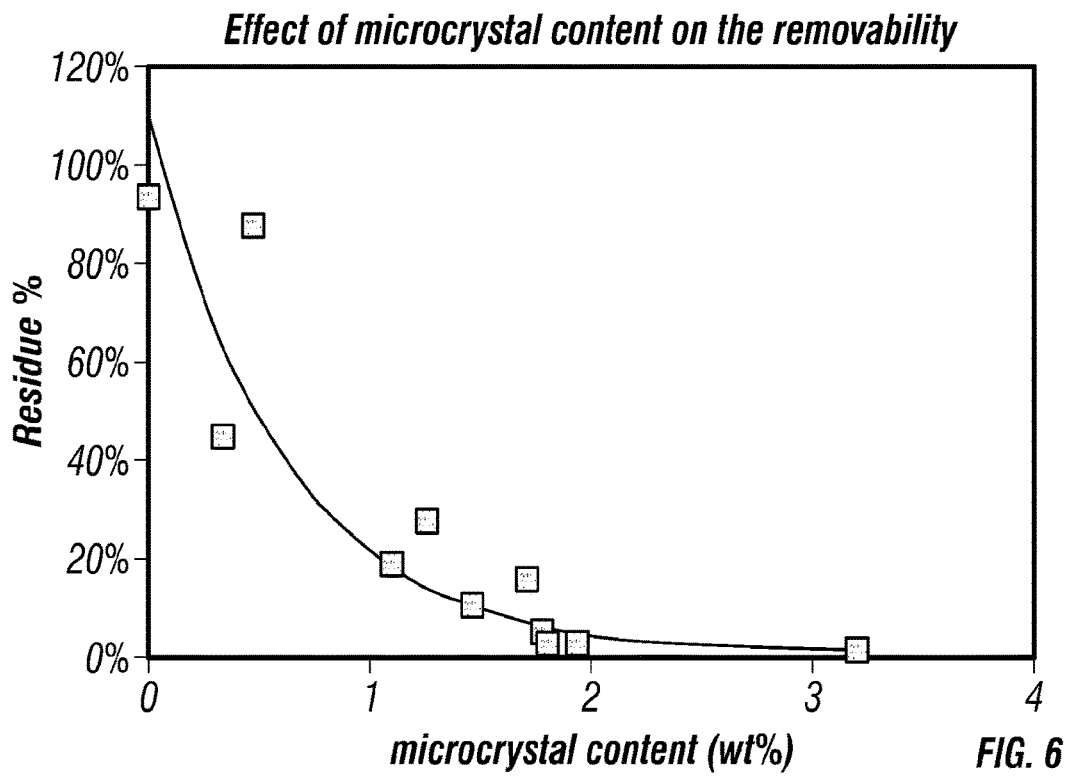
FIG. 6 is a graph showing the effect of microcrystal content on the removability
Figure 7:
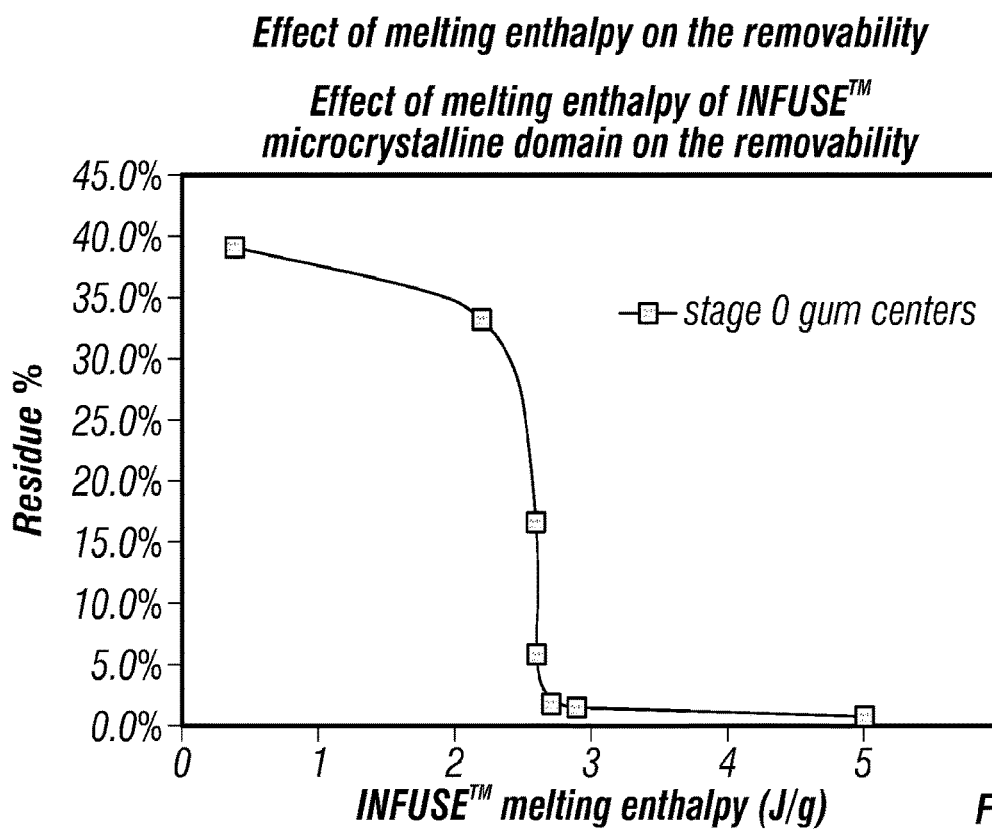
FIG. 7 is a graph showing the effect of melting enthalpy on the removability

In some embodiments, the melting point of the microcrystalline joint is at least 25° C. or at least 40° C. or at least 50° C. or at least 60° C. In some embodiments, the melting point of the microcrystalline joint is less than 80° C. In some embodiments the gum base will produce a cud which comprises at least 0.5% or at least 1.0% or at least 1.5% of microcrystalline joints by weight of the cud as shown in FIG. 6. In some embodiments, the crystallizable polymeric block is a polyolefin block and the microcrystalline joints have a melting enthalpy of at least 2.0 J/g or at least 2.6 J/g as shown in FIG. 7.

Figure 5:
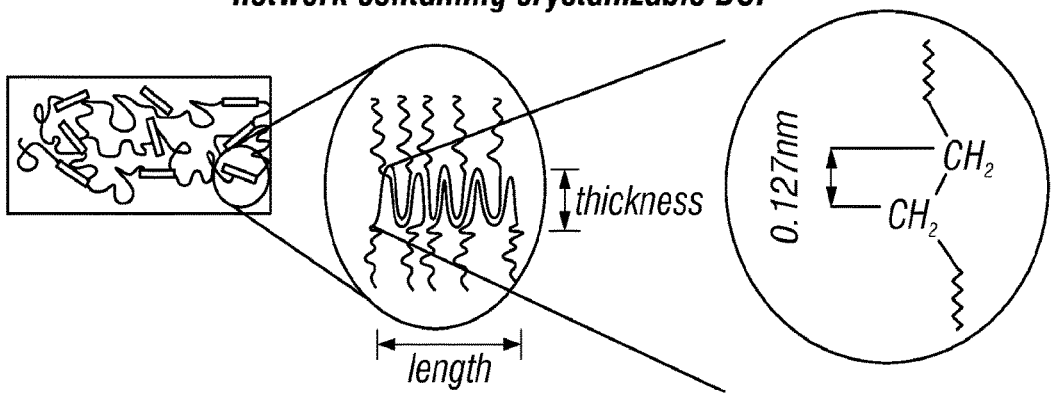
FIG. 5 is an illustration of the microcrystal structure in the chewing gum matrix with polymeric network containing crystallizable BCP

A crystalline domain of the present invention is illustrated in FIG. 5.

Figure 4:
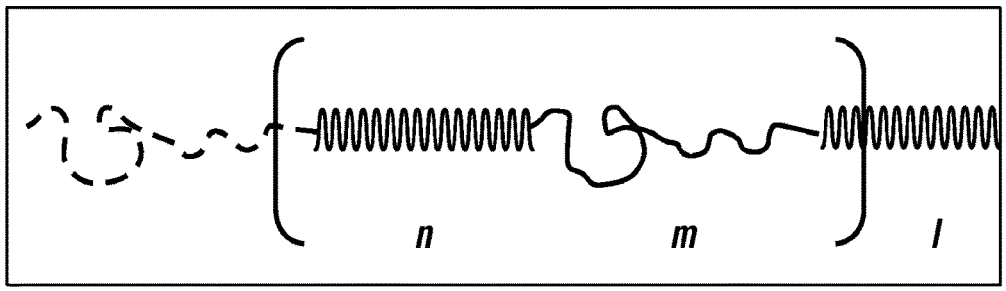
FIG. 4 is an illustration of a crystalline block copolymer.

It is possible to estimate the size of microcrystal domains in gum bases, and cuds produced from the gum bases, by Differential Scanning calorimetry (DSC). The crystalline polymeric structure is illustrated in FIG. 4 where n=the degree of polymerization of the crystallizable block; m=degree of polymerization of the amorphous block; and I=the number of total blocks (crystallizable and amorphous) in the polymer chain.

Crystallization of the hard blocks forces segregation of the amorphous soft blocks into the interlamellar regions. The crystallizable nature of the hard block and the crystalline morphologies are influenced by the average hard block length. A universal expression for the domain spacing, d, in crystalline-amorphous block copolymers also indicates that the crystalline block length has a stronger effect on the crystal domain size. The lamellar morphology consists of alternating layers of amorphous and crystalline blocks. The lamellae in the crystalline layers pack in a monolayer (bilayer causes higher free energy). A universal expression for the domain spacing, d, in Crystalline-amorphous diblock copolymers is:

$$d \sim N_t N_a^{-\alpha}$$

where $N_t$ is the total degree of polymerization and $N_a$ is the degree of polymerization of the amorphous block and α is a constant with a value of approximately 0.37. This indicates that the domain size is a function of both the length of crystallizable block and the length of the amorphous block. The equilibrium lamellar thickness of the microcrystalline domain is proportional to both its hard block length and to the overall crystallinity, i.e. how many hard blocks have been incorporated into the crystalline matrix. Typically, this length will be the largest dimension of the crystalline domain and is the dimension that is referred to when the term 'crystalline domain size' is used.

Ethylene-octene block copolymers form well-organized lamellar crystals with long, radial lamellae as illustrated in FIG. 5.

For low-molecular weight crystalline homopolymers such as polyethylene, the melting point is a function of polymerization degree and the crystal block lengths may be determined by using the Charlesby equation:

$$\frac{1}{T_m} = \frac{1}{T_{m(\infty)}} + \frac{B}{N}$$

where $T_m$ is the melting point of the homopolymer, $T_m(\infty)$ denotes the melting point of an infinitely long segment of crystals, N is the number of monomeric units in a crystal, and B is the slope of the plot of reciprocal of melting point of copolymer versus reciprocal of number of carbons in the crystal.

If the melting point of crystal domain and the projection length (Ip) of bonds in the polymeric backbone are known, the maximum crystal thickness (d) can be estimated by the Charlesby equation above and this equation:

$$d = N * Ip$$

Figure 2:
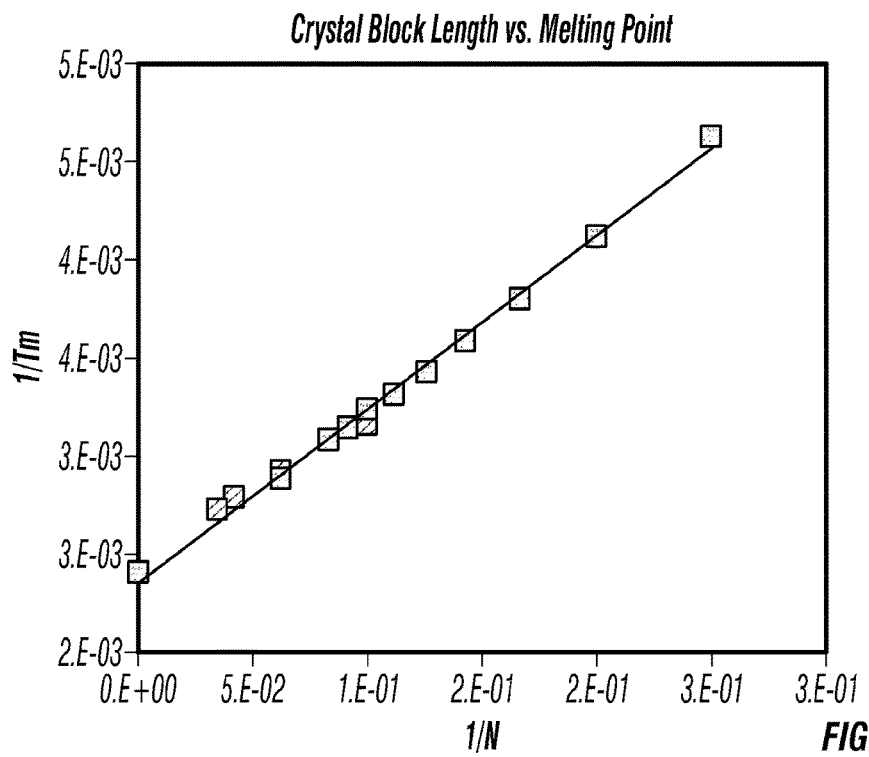
FIG. 2 is a graph of Crystal Block Length vs. Melting Point
Figure 3:
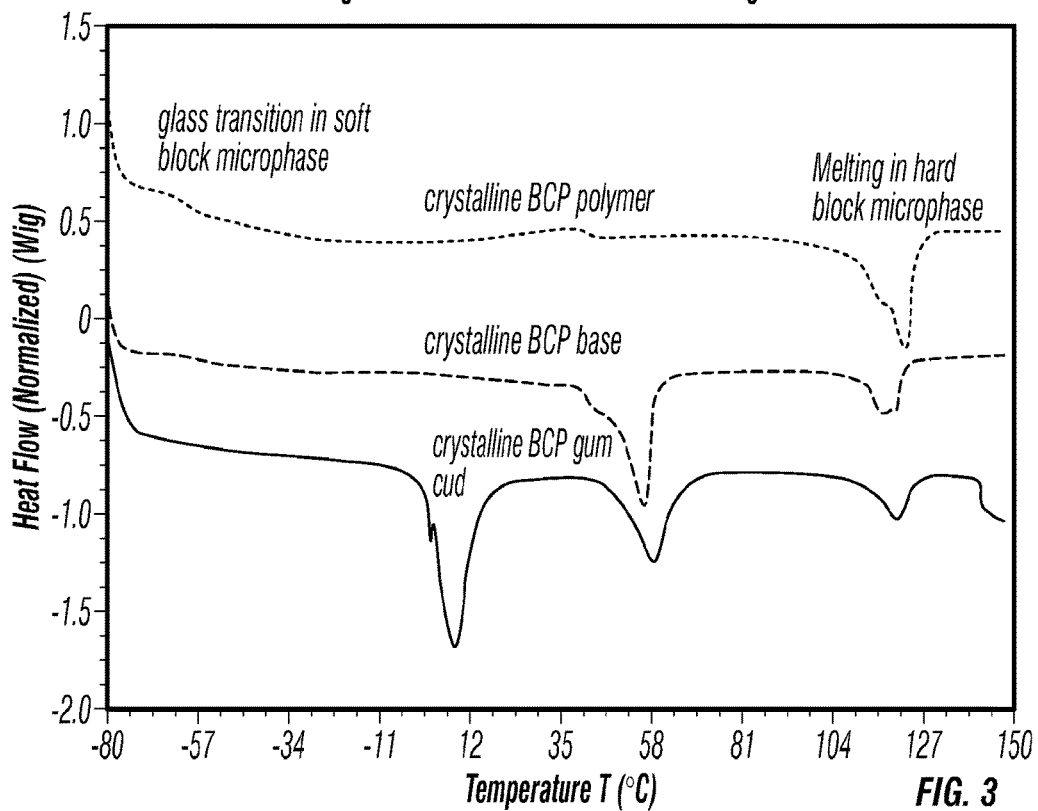
FIG. 3 is a DSC thermograph of DOW INFUSE™ 9807 block copolymer and a gum base and the chewed cud containing it

In order to obtain the B value, the $T_m(\infty)$ can be obtained by DSC of high molecular weight homopolymers (Mw>$10^6$ g/mole) and a series of homologous or low molecular weight homopolymers (Mw in the range $10^2$~$10^4$ g/mole, polydispersity <3). The polymerization degree N and $T_m$ of the series can be measured by GPC and DSC respectively. The reciprocal of $T_m$ (1/$T_m$) is plotted against the reciprocal of polymerization degree (1/N). A linear relationship should be obtained with the B value being the slope of the straight line as shown in FIG. 2.

For example, an ethylene-octene block copolymer backbone is composed by C—C σ bonds. The length of each C—C σ bond is 0.1541 nm. The projection length is 0.127 nm. Polymerization degree N of polyethylene vs. the melting point Tm (K) has following relationship:

$$N = 2.04 T_m / (100 - 0.25 T_m)$$

Microcrystal domain size can be estimated for free surfaces by atomic force microscopy (AFM). The samples from Ex 39 and Ex.41 were compression molded under 0.1 metric tons at 90° C. for 2 min to form the thin film and microtomed. A Veeco DI MultiMode V atomic force microscope (AFM) with a Nanoscope IIIa controller was used to probe the nanoscale crystalline structure of the films. Phase images of the sample surfaces were collected in tapping mode using NanoDevices Metrology Probes tips (350-380 kHz, 130 μm). The phase images indicated that there are rod-shape crystals in Ex 39. The thickness of the rod is about 30 nm and the length is about 200~300 nm. The rods aggregate to form larger crystalline domains in the gum base as the amount of ethylene-octene block copolymer increases. For the gum base matrix (Ex. 41), the basic crystalline cell in ethylene-octene block copolymer is rod-shaped with an aspect ratio that can be much higher than one. The dimensions of the rod are on the mesoscopic scale. Some rods aggregated and formed larger crystal domains which varied from ten to hundreds of nanometers in other formulations.

As an example, if ethylene is the crystallizable hard block monomer, in order to preserve the crystalline microphase at about the 55° C., the degree of polymerization (DP) should be higher than 15 as shown in FIG. 2. When $T_m$<104C, i.e. DP of ethylene is less than 35, the randomly oriented micellar crystal domain is less than 1 micron. In order to achieve the preferred size of lamellae thickness (~15 microns), the preferred DP of the hard block is around 36~71.

Copolymers useful in the present invention will have at least one soft polymeric block and two hard polymeric blocks. For purposes of this invention, soft polymeric blocks are those amorphous polymeric block which have a glass transition temperature ($T_g$) which is below mouth or body temperature such as below 37° C., or below −10° C. or even below −20° C. soft polymeric blocks could also be semicrystalline polymeric block with both glass transition temperature ($T_g$) and melting point below mouth or body temperature such as below 37° C., or below −10° C. or even below −20° C. This insures that the soft block will be in an amorphous state during chewing. This is important to provide elasticity to the polymer.

For purposes of the present invention, the term 'crystallizable hard block' means that the hard block is capable of forming one or more crystalline domains which constitute at least 45% of the hard block. In some cases, the hard crystalline block will from crystalline domains which constitute more than 60% or more than 70% or more than 80% or more than 90% or even more than 95% by weight of the hard block. Typically, the crystalline domains form after the polymer is held at a temperature below the melting point for a period of an hour or more. Since the attainable degree of crystallization decreases with the increase of Tg/Tm, The Tg/Tm ratio of crystallizable polymer is lower than 0.67, or lower than 0.50, or lower than 0.40. In the present invention, the melting point of the hard polymeric block in the crystalline form will typically be greater than 20° C.

Examples of polymers which are suitable for forming the soft polymeric blocks include polyisoprene, poly(6-methyl-caprolactone), poly(6-butyl-ϵ-caprolactone (also known as poly(ϵ-decalactone), other polymers of alkyl or aryl substituted ϵ-caprolactones, polydimethylsiloxane, polybutadiene, polycyclooctene, polyvinyllaurate, polymenthide, polyfarnesene, polymyrcene, random copolymers prepared from comonomer pairs consisting of alkene pairs such as ethene/1-octene and ethene/butene, alkene-vinylalkanoate pairs such as ethene/vinylacetate, different hydroxyalkanoate hydroxybutyrate/hydroxyhexanoate, hydroxybutyrate/hydroxyvalerate and hydroxybutyrate/hydroxyoctanoate alkene-acrylate pairs such as ethene/butylacrylate, lactones/lactide pairs such as caprolactone/L-lactide and alkylene oxide pairs wherein at least one of the alkylene oxides has a carbon chain having at least three carbons such as ethylene oxide/propylene oxide and methylene oxide/propylene oxide. In some cases, the block copolymers of the present invention may contain any number of different hard and/or soft block polymers of different monomers in the multiple blocks.

In some embodiments, the block copolymer will be a tri-block copolymer having two hard end blocks and a soft mid block. In other embodiments, the copolymer will be a block polymers having a structure which may be designated as (A-B)$_n$ or (A-B-C)$_n$ in the cases where there are two or three different polymeric blocks (respectively) repeated n times. It is possible that the repeating sequence may include more than one polymeric block of the same monomeric composition, for example (A-B-A)$_n$. In such cases, the A blocks contained within the chain will effectively be twice as long as A blocks at the end of the chain, for example A-B-A-A-B-A-A-B-A in the case where n=3.

In some embodiments, there will be three repeating sequences or four repeating sequences or five repeating sequences or even many repeating sequences. In some embodiments, each repeating sequence will include exactly two or exactly three or exactly four or more different polymeric blocks. It will be understood that the repeating sequences may be polydisperse.

In order for the hard crystallizable blocks to produce the desired crystalline domain size and distribution, they must have a certain minimum and maximum lengths. It is believed that the hard crystallizable blocks must have a degree of polymerization (i.e. the number of monomer units in the block) of at least 15 or at least 36 or at least 56. Preferably, the hard block will have a maximum DP of 1200 or 700 or 140 or 68.

For the soft blocks, a DP of 15 is believed to be the minimum length to have an acceptably large continuous phase.

It is also important that the hard blocks constitute a sufficiently large portion of the entire copolymer. In this regard, the hard blocks collectively should constitute greater than 5% or greater than 10% or greater than 30% by molar fraction of the entire polymer. At the same time, it is also important that the soft block(s) constitute a sufficient portion of the entire polymer. In this regard, it is important that the hard blocks constitute less than 88% or less than 66% or less than 45% by molar fraction of the entire copolymer, the balance being composed of one or more soft blocks In some embodiments, a linking unit, designated X, may be present between some or all of the repeating sequences. Thus the block copolymer may be designated as $(A-B-X)_n$ in the case where there are a total of n sequences of two repeating blocks where a linking unit is located between each repeating sequence. Suitable linking agents are capable of connecting polymer blocks via covalent chemical bonding and may provide for inter- and intramolecular non-covalent bonding, such as hydrogen bonding or dipolar interaction. Examples of linking agents which may be useful in the present invention include urethanes, esters, amides, carbonates, carbamates, urea, dialkylsiloxy- and diarylsiloxy-based units, ethers, thioethers and olefins. Urethane-based units may optionally include urea structures.

The linking unit may be used to extend the length of the block, thereby increasing its elastomeric properties. In some embodiments it will be desirable to build the block chain up to a molecular weight ($M_n$) of 26,000 to 200,000 g/mole or preferably 40,000 to 80,000 g/mole. A weight average molecular weight ($M_w$) 80,000 to 700,000 g/mole or preferably 90,000 to 150,000 g/mole is also appropriate.

Alternatively, the techniques of chain shuttling polymerization may be used to build and extend the crystallizable block copolymer chain.

In some embodiments of the present invention, at least two of the at least two polymeric blocks will be immiscible with each other. In some embodiments, at least some of the polymeric blocks will have a glass transition temperature ($T_g$) of less than 70° C., or less than 60° C. or less than 50° C., or less than 40° C. In some embodiments, the different polymeric blocks will have significantly different glass transition temperatures from each other to enhance the elastomeric properties of the block copolymer.

By manipulating the overall molecular weight, the size and monomer composition of the polymer blocks, the number of the repeating sequences and the presence and frequency of non-covalent crosslinking groups, a product developer may produce a block copolymer having the best combination of chewing texture, removability and processing properties. In some cases, the polymer may be tuned for specific chewing gum compositions, using different parameters for different flavors to compensate for different degrees of plasticization by the flavors. In other cases, the polymer may be "tuned" for a particular marketplace to account for differences in local climate and consumer preferences. The block copolymer may also be tuned to maximize removability of chewed cuds from environmental surfaces by promoting the formation of microphase separation internal structures as previously discussed.

A wide variety of gum base and chewing gum formulations including the block copolymers of the present invention can be created and/or used. In some embodiments, the present invention provides for gum base formulations which are conventional gum bases that include wax or are wax-free. In some embodiments, the present invention provides for chewing gum formulations that can be low or high moisture formulations containing low or high amounts of moisture-containing syrup. Low moisture chewing gum formulations are those which contain less than 1.5% or less than 1% or even less than 0.5% water. Conversely, high moisture chewing gum formulations are those which contain more than 1.5% or more than 2% or even more than 2.5% water. The block copolymers of the present invention can be used in sugar-containing chewing gums and also in low sugar and non-sugar containing gum formulations made with sorbitol, mannitol, other polyols (sugar alcohols), and non-sugar carbohydrates.

In some embodiments, a block copolymer of the present invention may be used as the sole elastomer. In other embodiments it will be combined with other base elastomers for use in chewing gum base. Such other elastomers, where used, include synthetic elastomers including polyisobutylene, isobutylene-isoprene copolymers, styrene-butadiene copolymers, polyisoprene and polyvinylacetate, among others. Natural elastomers that can be used include natural rubbers such as chicle and proteins such as zein or gluten and modified starches such as starch laureates and starch acetates. In some embodiments, the block copolymers may be blended with removable or environmentally degradable polymers such as polylactides, and polyesters prepared from food acceptable acids and alcohols. It is important that the block copolymers of the present invention be food grade. While requirements for being food grade vary from country to country, food grade polymers intended for use as masticatory substances (i.e. gum base) will typically have to meet one or more of the following criteria. They may have to be specifically approved by local food regulatory agencies for this purpose. They may have to be manufactured under "Good Manufacturing Practices" (GMPs) which may be defined by local regulatory agencies, such practices ensuring adequate levels of cleanliness and safety for the manufacturing of food materials. Materials (including reagents, catalysts, solvents and antioxidants) used in the manufacture will desirably be food grade (where possible) or at least meet strict standards for quality and purity. The finished product may have to meet minimum standards for quality and the level and nature of any impurities present, including residual monomer content. The manufacturing history of the material may be required to be adequately documented to ensure compliance with the appropriate standards. The manufacturing facility itself may be subject to inspection by governmental regulatory agencies. Again, not all of these standards may apply in all jurisdictions. As used herein, the term "food grade" will mean that the block copolymers meet all applicable food standards in the locality where the product is manufactured and/or sold.

In some embodiments of this invention, the block copolymer is combined with a di-block copolymer comprising two polymer blocks which are individually compatible with at least two of the blocks which make up the larger block copolymer. In these embodiments, the di-block copolymer plasticizes the block copolymer to provide a plasticized elastomer material which is consistent with the chew properties of conventional elastomer/plasticizer systems. The di-block copolymer may also provide additional benefits such as controlling release of flavors, sweeteners and other active ingredients, and reducing surface interactions of discarded cuds for improved removability from environmental surfaces. Furthermore, the di-block copolymer may better help maintain the microphase separation structures in the block copolymer as compared to other plasticizers.

By compatible, it is meant that the component polymers (when separate from the block or di-block configuration) have a chemical affinity and can form a miscible mixture which is homogeneous on the microdomain scale. This can normally be determined by a uniform transparent appearance. In cases where uncertainty exists, it may be helpful to stain one of the polymers in which case the mixture will, when examined with microscopic methods, have a uniform color if the polymers are compatible or exhibit swirls or a mottled appearance if the polymers are incompatible. Compatible polymers typically have similar solubility parameters as determined empirically or by computational methods. In preferred embodiments, at least two of the at least two polymer blocks which comprise the block copolymer will be essentially identical to those of the di-block copolymer to ensure the greatest possible compatibility. Further information on polymer compatibility may be found in Pure & Appl. Chem, Vol 58, No. 12, pp 1553-1560, 1986 (Krause) which is incorporated by reference herein.

In some embodiments, the solubility parameter of crystallizable block copolymer is less 29 $MPa^{1/2}$. In some embodiments, the solubility parameter of crystallizable block copolymer is less 24 $MPa^{1/2}$.

In some embodiments, the block copolymers of the present invention are elastomeric at mouth temperature in the sense of having an ability to be stretched to at least twice of an original length and to recover substantially to such original length (such as no more than 150%, preferably no more than 125% of the original length) upon release of stress. Preferably, the polymer will also be elastomeric at room temperature and even lower temperatures which may be encountered in the outdoor environment.

In preferred embodiments of the present invention, cuds formed from gum bases containing block copolymers are readily removable from concrete if they should become adhered to such a surface. By readily removable from concrete, it is meant that the cuds which adhere to concrete can be removed with minimal effort leaving little or no adhering residue. For example, readily removable cuds may be removable by use of typical high pressure water washing apparatuses in no more than 20 seconds leaving no more than 20% residue based on the original area covered by the adhered cud. In some cases, a readily removable cud may be peeled off of a concrete surface by grasping and pulling with fingers leaving no more than 20% residue by area of the original cud. Alternatively, a more formal test can be conducted as follows. Two grams of gum is chewed or manually kneaded under water for 20 minutes to produce a cud. The cud is then immediately placed on a concrete paver stone and covered with silicone coated paper. 150 to 200 pounds of pressure is applied to the cud (for example by stepping on it with a flat soled shoe) for approximately two seconds. The silicone-coated paper is then removed and the adhered cud and paver stone are conditioned at 45° C./60% RH for 48 hours. A flat-edged metal scraper held at a 15° angle is used to make a single scrape of the cud over approximately three to five seconds. The results are then evaluated using image analysis software, such as ImageJ 1.41o from the National Institutes of Health, to measure the portion of the cud remaining. Readily removable cuds will leave no more than 20% of the original mass as residue and require no more than approximately 50 N of force. Of course, it is desirable that the cud leave even less residue and require less force to remove.

In some embodiments, the block copolymer or block/di-block copolymer blend (hereinafter the block copolymer elastomer system) will be the sole component of the insoluble gum base. In other embodiments, the block copolymer or block copolymer elastomer system will be combined with softeners, fillers, colors, antioxidants and other conventional gum base components. In some embodiments, the block copolymer or block copolymer elastomer system gum bases may be used to replace conventional gum bases in chewing gum formulas which additionally contain water-soluble bulking agents, flavors, high-intensity sweeteners, colors, pharmaceutical or nutraceutical agents and other optional ingredients. These chewing gums may be formed into sticks, tabs, tapes, coated or uncoated pellets or balls or any other desired form. By substituting the block copolymer or block copolymer elastomer system of the present invention for a portion or all of the conventional gum base elastomers, consumer-acceptable chewing gum products can be manufactured which exhibit reduced adhesion to environmental surfaces, especially concrete.

In order to further enhance the removability of cuds formed from gum bases comprising the block copolymer systems of the present invention, it may be desirable to incorporate other known removability-enhancing features into the chewing gum or gum base. For example, certain additives such as emulsifiers and amphiphilic polymers may be added. Another additive which may prove useful is a polymer having a straight or branched chain carbon-carbon polymer backbone and a multiplicity of side chains attached to the backbone as disclosed in WO 06-016179. Still another additive which may enhance removability is a polymer comprising hydrolyzable units or an ester and/or ether of such a polymer. One such polymer comprising hydrolyzable units is a copolymer sold under the Trade name Gantrez®. Addition of such polymers at levels of 1 to 20% by weight of the gum base may reduce adhesion of discarded gum cuds. These polymers may also be added to the gum mixer at a level of 1 to 7% by weight of the chewing gum composition.

Another gum base additive which may enhance removability of gum cuds is high molecular weight polyvinyl acetate having a molecular weight of 100,000 to 600,000 daltons as disclosed in US 2003/0198710. This polymer may be used at levels of 7 to 70% by weight of the gum base.

Another approach to enhancing removability of the present invention involves formulating gum bases to contain less than 5% (i.e. 0 to 5%) of a non-silica filler such as a calcium carbonate and/or talc filler and/or 5 to 40% amorphous silica filler. Formulating gum bases to contain 5 to 15% of high molecular weight polyisobutylene (for example, polyisobutylene having a weight average or number average molecular weight of at least 200,000 daltons) is also effective in enhancing removability. High levels of emulsifiers such as powdered lecithin may be incorporated into the chewing gum at levels of 3 to 7% by weight of the chewing gum composition. It may be advantageous to spray dry or otherwise encapsulate the emulsifier to delay its release. Any combination of the above approaches may be employed simultaneously to achieve improved removability. Specifically, removability can be enhanced by incorporating a block copolymer or block copolymer elastomer system as previously described into a gum base having 0 to 5% of a calcium carbonate or talc filler, 5 to 40% amorphous silica filler, 5 to 15% high molecular weight polyisobutylene, 1 to 20% of a polymer having a straight or branched chain carbon-carbon polymer backbone and a multiplicity of side chains attached to the backbone and further incorporating this gum base into a chewing gum comprising 3 to 7% of an emulsifier, such as lecithin, which is preferably encapsulated such as by spray drying. Many variations on this multi-component solution to the cud adhesion problem can be employed. For example, the polymer having a straight or branched chain carbon-carbon polymer backbone or the ester and/or ether of a polymer comprising hydrolyzable units may be added to the gum mixer instead of incorporating it into the gum base, in which case it may be employed at a level of 1 to 7% of the chewing gum composition. Also, in some cases it may be desirable to omit one or more of the above components for various reasons.

Yet another approach to improving removability is to incorporated softeners or plasticizers which will leach out of the gum cud after it is discarded. This can cause the cud to become more cohesive and rigid allowing it to be popped off adhered substrates.

The block copolymer or block copolymer elastomer system, when used according to the present invention, affords the chewing gum consumer acceptable texture, shelf life and flavor quality. Because the block copolymer or block copolymer elastomer systems have chewing properties similar to other elastomers in most respects, gum bases containing them create a resultant chewing gum product that has a high consumer-acceptability.

The present invention provides in some embodiments gum base and chewing gum manufacturing processes which have improved efficiency as compared with conventional processes.

Additional features and advantages of the present invention are described in, and will be apparent from, the detailed description of the presently preferred embodiments.

Block copolymers of the present invention have two or more different polymer blocks covalently bonded together, for example in an A-B, A-B-A or A-B-C configuration. In some embodiments, at least two of the at least two polymers which comprise the block copolymer will be mutually incompatible. By mutually incompatible it is meant that the polymers are not compatible as previously described. By using incompatible blocks, the formation of microphase separation internal structures in chewed cuds (as previously described) may be enhanced to improve removability of the cud from environmental surfaces to which it may have become undesirably attached.

The polymeric blocks which make up the block copolymers of the present invention may comprise soft polymers, hard polymers or a mixture of both. By soft polymer, it is meant that the block is composed of a polymer having a glass transition temperature substantially below mouth temperature. (For purposes of the present invention, a polymer's glass transition temperature is taken to mean the glass transition temperature of that polymer in a high molecular weight form such as 200,000 daltons, even in cases where only shorter blocks are present in the block copolymer.) Specifically, soft polymers will have a $T_g$ below 20° C. or below 10° C. or even below 0° C. Soft polymers will also have a complex shear modulus between $10^3$ and $10^8$ Pascals at 37° C. and 1 rad/sec. Preferably, the shear modulus will be between $10^4$ and $10^7$ more preferably between $5\times10^5$ and $5\times10^6$ at 37° C. and 1 rad/sec. Examples of soft polymers include homopolymers of isoprene, homopolymers of 6-methylcaprolactone, poly(6-butyl-ε-caprolactone), polymers of alkyl or aryl substituted ε-caprolactones, polydimethylsiloxane homopolymers, polybutadiene, polycyclooctene, polyvinyllaurate. In some embodiments, a soft polymeric block may be a random or alternating copolymer. Generally, soft polymeric blocks will be non-crystalline at typical storage and mouth temperatures. However, in some cases a soft polymeric block may have some semi-crystalline domains.

In contrast, by hard polymeric blocks it is meant that the block(s) comprise essentially identical polymers or compatible or incompatible polymers having a $T_g$. above about 20° C. or above 30° C. or even above 40° C. It is also important that the hard polymer(s) have a $T_g$ sufficiently low as to allow convenient and efficient processing, especially when the block copolymer or block copolymer elastomer system is to be used as the sole component in a gum base. Thus the hard polymer(s) should have a $T_g$ below 70° C. and preferably below 60° C. Use of hard polymers having glass transition temperatures in this range allows lower processing temperatures, reduced mixing torque and shorter mixing times. This results in energy savings and effectively increased mixing capacity. In block copolymers of the present invention, it is important that at least one of the hard polymers be capable of crystallizing at temperatures below the melting point (which should be below 20° C.). However, in the case of copolymers having two or more hard polymeric blocks of differing chemical composition (i.e. from different monomers) it is acceptable for additional hard polymeric blocks (other than the crystallizable hard polymeric block or blocks) to be amorphous or semicrystalline, that is, not capable of forming one or more crystalline domains which constitute at least 45% of the hard block when held at a temperature below the melting point for a period of an hour or more. Examples of non-crystalline hard polymers useful in the present invention include homopolymers of D,L-lactide, polylactic acid homopolymers, homopolymers of vinylacetate, poly(ethylene terephthalate) homopolymers, homopolymers of glycolic acid and poly (propyl methacrylate). Hard polymeric blocks may be random or alternating copolymers such as a random or alternating copolymer of glycolic acid and lactic acid. Typically, random or alternating hard polymeric blocks will be amorphous or semi-crystalline at storage and chewing temperatures.

In some embodiments soft and hard polymeric blocks which are incompatible with each other will be used to form the block copolymer to maximize the formation of microphase separation internal structures.

In some cases, the block copolymer may exhibit only a single glass transition temperature. This may be due to the small size of the blocks or the small total amount of individual monomers in the block copolymer. Or they may be due to the different blocks being miscible together or having very similar $T_g$s. In other cases, two or more glass transitions may be observable. In some embodiments of the present invention the block copolymer will exhibit at least two glass transition temperatures, the highest being between 20° C. and 70° C. (preferably between 30° C. and 50° C.) and at least one being less than 40° C. or less than 30° C. or less than 20° C. or less than 10° C. It is believed that such a polymer, when combined with any softeners and plasticizers in the gum base, will offer a desirable combination of easy processing, good chewing texture and good removability when the surface from which the cud is to be removed is between the highest $T_g$ and a lower $T_g$ of the block copolymer. It is expected that plasticizers added to the base will reduce the glass transition temperatures such that the highest $T_g$ will be below mouth temperature (about 35° C.) and at least one $T_g$ will be below the temperature of concrete or other adhered substrate during the removal process. The optimal glass transition temperatures will depend on the amount and effectiveness of the plasticizers incorporated into the gum base (if any.)

In some embodiments, the block copolymers of the present invention, when incorporated into gum bases and chewing gums and chewed, produce cohesive cuds which are more easily removed from environmental surfaces if improperly discarded. Cohesive cuds, that is, cuds which display a high degree of self adhesion, tend to contract and curl away from attached surfaces such as concrete. In the case of the block copolymers of the present invention, it is believed that this cohesiveness is due to the formation of microphase separation internal structures which increase the cohesivity of the cud. These internal structures are caused by microphase domain separation and subsequent ordering of the hard and soft domains of the polymer molecules. Depending on the weight ratio and number of the different blocks, lamellar, cylindrical, spherical or gyroidal and/or other microdomain structures may predominate in the polymer matrix, although smaller levels of the other structural domains will likely exist concurrently. It may be difficult to determine which structure predominates in any given system and even small changes in the ratio of the different blocks may produce disproportionate changes in texture due to this phenomenon. This provides a means of adjusting the texture significantly, though perhaps not linearly, by adjusting the ratio up or down.

In some embodiments, the block copolymers of the present invention and the gum bases prepared from them produce gum cuds which are environmentally degradable. By environmentally degradable, it is meant that the polymer can be broken into smaller segments by environmental forces such as microbial action, hydrolytic action, oxidation, UV light or consumption by insects. This further reduces or eliminates the aforementioned nuisance of improperly discarded gum cuds. In some embodiments, the block copolymers of the present invention are produced from sources other than petroleum feed stocks for enhanced sustainability and to avoid consumer concerns regarding the use of petroleum derived materials in chewing gum products. In some embodiments, the monomers used to produce the block copolymers, for example D,L-lactide, farnesene, myrcene and isoprene, are or can be produced from renewable resources, typically agricultural crops, trees and natural vegetation.

When used to formulate a gum base of the present invention, it is preferred that the block copolymers of the present inventions be plasticized with a suitable plasticizing agent. One preferred plasticizing agent is a di-block copolymer having polymeric blocks which are compatible with those of the block copolymer It is preferred that the blocks of the di-block copolymer be composed of the same polymers used in the block copolymer. However, other compatible polymers may also be used. It is preferred that the di-block copolymer blocks have no more than roughly half the molecular weight of the corresponding blocks in the block copolymer which the di-block copolymer is plasticizing.

When a multi-block copolymer (i.e. having three or more blocks) and a di-block copolymer are used in a block copolymer elastomer system, it is preferred that the two components be used in a ratio of from 1:99 to 99:1 and more preferably 40:60 to 95:5 di-block:multi-block to assure that the resulting block copolymer elastomer system will have proper texture for processing and chewing. The block copolymers may also be plasticized with a conventional plasticizing agent to form an elastomeric material which, when formulated as a gum base, has sufficient chewing cohesion to be cud-forming and chewable at mouth temperatures. Plasticizers typically function to lower the $T_g$ of a polymer to make the gum cud chewable at mouth temperature. Suitable plasticizers typically are also capable of decreasing the shear modulus of the base. Suitable plasticizing agents are substances of relatively low molecular weight which have a solubility parameter similar to the polymer so they are capable of intimately mixing with the polymer and reducing the $T_g$ of the mixture to a value lower than the polymer alone. Generally, any food acceptable plasticizer which functions to soften the block copolymer and render it chewable at mouth temperature will be a suitable plasticizer. Plasticizers which may be used in the present invention include triacetin, phospholipids such as lecithin and phosphatidylcholine, triglycerides of $C_4$-$C_6$ fatty acid such as glycerol trihexanoate, polyglycerol, polyricinoleate, propylene glycol di-octanoate, propylene glycol di-decanoate, triglycerol penta-caprylate, triglycerol penta-caprate, decaglyceryl hexaoleate, decaglycerol decaoleate, citric acid esters of mono- or di-glycerides, polyoxyethylene sorbitan such as POE (80) sorbitan monolaurate, POE (20) sorbitan monooleate, rosin ester and polyterpene resin.

Fats, waxes and acetylated monoglycerides can enhance the effect of the suitable plasticizers when incorporated into the gum bases of the present invention. However, fats and waxes may not be suitable for use as the sole plasticizers in these compositions.

It is preferred that the block copolymer be preblended with the di-block copolymer or other plasticizer, for example by blending in a solvent, or by using mechanical blending at temperatures above the highest glass transition temperature of the block copolymer or by polymerizing the di- and block copolymers together.

The water-insoluble gum base of the present invention may optionally contain conventional petroleum-based elastomers and elastomer plasticizers such as styrene-butadiene rubber, butyl rubber, polyisobutylene, terpene resins and estergums. Where used, these conventional elastomers may be combined in any compatible ratio with the block copolymer. In a preferred embodiment, significant amounts (more than 1 wt. %) of these conventional elastomers and elastomer plasticizers are not incorporated into a gum base of the present invention. In other preferred embodiments, less than 15 wt. % and preferably less than 10 wt. % and more preferably less than 5 wt. % of petroleum-based elastomers and elastomer plasticizers are contained in the gum base of the present invention. Other ingredients which may optionally be employed include inorganic fillers such as calcium carbonate and talc, emulsifiers such as lecithin and mono- and di-glycerides, plastic resins such as polyvinyl acetate, polyvinyl laurate, and vinylacetate/vinyl laurate copolymers, colors and antioxidants.

The water-insoluble gum base of the present invention may constitute from about 5 to about 95% by weight of the chewing gum. More typically it may constitute from about 10 to about 50% by weight of the chewing gum and, in various preferred embodiments, may constitute from about 20 to about 35% by weight of the chewing gum.

A typical gum base useful in this invention includes about 5 to 100 wt. % plasticized block copolymer elastomer, 0 to 20 wt. % synthetic elastomer, 0 to 20 wt. % natural elastomer, about 0 to about 40% by weight elastomer plasticizer, about 0 to about 35 wt. % filler, about 0 to about 35 wt. % softener, and optional minor amounts (e.g., about 1 wt. % or less) of miscellaneous ingredients such as colorants, antioxidants, and the like.

Further, a typical gum base includes at least 5 wt. % and more typically at least 10 wt. % softener and includes up to 35 wt. % and more typically up to 30 wt. % softener. Still further, a typical gum base includes 5 to 40 wt. % and more typically 15 to 30 wt. % hydrophilic modifier such as polyvinylacetate. Minor amounts (e.g., up to about 1 wt. %) of miscellaneous ingredients such as colorants, antioxidants, and the like may also be included into such a gum base.

In an embodiment, a chewing gum base of the present invention contains about 4 to about 35 weight percent filler, about 5 to about 35 weight percent softener, about 5 to about 40% hydrophilic modifier and optional minor amounts (about one percent or less) of miscellaneous ingredients such as colorants, antioxidants, and the like.

Additional elastomers may include, but are not limited to, polyisobutylene having a viscosity average molecular weight of about 100,000 to about 800,000, isobutylene-isoprene copolymer (butyl elastomer), polyolefin thermoplastic elastomers such as ethylene-propylene copolymer and ethylene-octene copolymer, styrene-butadiene copolymers having styrene-butadiene ratios of about 1:3 to about 3:1 and/or polyisoprene, and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof.

The elastomer component of gum bases used in this invention may contain up to 100 wt. % block copolymer. In some embodiments, the block copolymers of the present invention may be combined with compatible plasticizers (including di-block copolymers as previously described) and the plasticized copolymer system may be used as the sole components of a gum base.

Alternatively, mixtures of plasticized or unplasticized block copolymers with other elastomers also may be used. In such embodiments, mixtures with conventional elastomeric components of gum bases may comprise least 10 wt. % plasticized or unplasticized block copolymer, typically at least 30 wt. % and preferably at least 50 wt. % of the elastomer. In order to provide for improved removability of discarded gum cuds form environmental surfaces, gum bases of the present invention will contain an elastomeric component which comprises at least 10%, preferably at least 30%, more preferably at least 50% and up to 100 wt. % plasticized or unplasticized block copolymer in addition to other non-elastomeric components which may be present in the gum base. Due to cost limitations, processing requirements, sensory properties and other considerations, it may be desirable to limit the elastomeric component of the gum base to no more than 90%, or 75% or 50% plasticized or unplasticized block copolymer.

A typical gum base containing block copolymers of the present invention may have a complex shear modulus (the measure of the resistance to the deformation) of 1 kPa to 10,000 kPa at 40° C. (measured on a Rheometric Dynamic Analyzer with dynamic temperature steps, 0-100° C. at 3° C./min; parallel plate; 0.5% strain; 10 rad/sec). Preferably, the complex shear modulus will be between 10 kPa and 1000 kPa at the above conditions. Gum bases having shear modulus in these ranges have been found to have acceptable chewing properties.

A suitable block copolymer used in this invention typically should be free of strong, undesirable off-tastes (i.e. objectionable flavors which cannot be masked) and have an ability to incorporate flavor materials which provide a consumer-acceptable flavor sensation. Suitable block copolymers should also be safe and food acceptable, i.e. capable of being food approved by government regulatory agencies for use as a masticatory substance, i.e. chewing gum base. Furthermore, it is preferable that the polymers be prepared using only food safe catalysts, reagents and solvents.

Typically, the block copolymers of the present invention have sufficient chewing cohesion such that a chewing gum composition containing such material forms a discrete gum cud with consumer acceptable chewing characteristics.

Elastomer plasticizers commonly used for petroleum-based elastomers may be optionally used in this invention including but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer plasticizers also will vary depending on the specific application, and on the type of elastomer which is used.

In addition to natural rosin esters, also called resins, elastomer solvents may include other types of plastic resins. These include polyvinyl acetate having a GPC weight average molecular weight of about 2,000 to about 90,000, polyethylene, vinyl acetate-vinyl laurate copolymer having vinyl laurate content of about 5 to about 50 percent by weight of the copolymer, and combinations thereof. Preferred weight average molecular weights (by GPC) for polyisoprene are 50,000 to 80,000 and for polyvinyl acetate are 10,000 to 65,000 (with higher molecular weight polyvinyl acetates typically used in bubble gum base). For vinyl acetate-vinyl laurate, vinyl laurate content of 10-45 percent by weight of the copolymer is preferred. Preferably, a gum base contains a plastic resin in addition to other materials functioning as elastomer plasticizers.

Additionally, a gum base may include fillers/texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, lecithin, paraffin wax, microcrystalline wax, natural waxes and combinations thereof. Lecithin and mono- and di-glycerides also function as emulsifiers to improve compatibility of the various gum base components.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and multi-calcium phosphate and calcium sulfate. Insoluble organic fillers including cellulose polymers such as wood as well as combinations of any of these also may be used.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

As noted, the base may include wax or be wax-free. An example of a wax-free gum base is disclosed in U.S. Pat. No. 5,286,500, the disclosure of which is incorporated herein by reference.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents (which may be water insoluble), water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% by weight of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed. In the case of syrups and other aqueous solutions, it is generally desirable to use the minimum practical level of water in the solution to the minimum necessary to keep the solution free-flowing at acceptable handling temperatures. The usage level of such syrups and solutions should be adjusted to limit total moisture in the gum to less than 3 wt. %, preferably less than 2 wt. % and most preferably less than 1 wt. %.

High intensity artificial sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, *stevia* and *stevia* compounds such as rebaudioside A, dihydrochalcones, thaumatin, monellin, lo han guo and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

In addition to typical chewing gum components, chewing gums of the present invention may include active agents such as dental health actives such as minerals, nutritional supplements such as vitamins, health promoting actives such as antioxidants for example resveratrol, stimulants such as caffeine, medicinal compounds and other such additives. These active agents may be added neat to the gum mass or encapsulated using known means to prolong release and/or prevent degradation. The actives may be added to coatings, rolling compounds and liquid or powder fillings where such are present.

It may be desirable to add components to the gum or gum base composition which enhance environmental degradation of the chewed cud after it is chewed and discarded. For example, an enzyme capable of attacking one or more of the polymeric components (such as one or more of the polymeric blocks in the block copolymer) may be added to the chewing gum formula. In the case of a polyester, an esterase enzyme may be added to accelerate decomposition of the polymer. Alternatively, proteinases such as proteinase K, pronase, and bromelain can be used to degrade poly(lactic acid) and cutinases may be used to degrade poly(6-methyl-ε-caprolactone). Such enzymes may be available from Valley Research, Novozymes, and other suppliers. Optionally, the enzyme or other degradation agent may be encapsulated by spray drying, fluid bed encapsulation or other means to delay the release and prevent premature degradation of the cud. It is also possible to immobilize an enzyme into a gum or gum base by grafting it on to a polymer or filler in the gum or gum base to provide extended degradation action which may be necessary to sufficiently control degradation of the block copolymer. Typically, immobilization or grafting is accomplished using glutaraldehyde, oxidized dextran, or some other cross-linking agent with reactivity to chemical functional groups on either the enzyme or the substrate of interest. The degradation agent (whether free, encapsulated or immobilized) may be used in compositions employing block copolymers and block copolymer elastomer systems as well as the multi-component systems previously described to further reduce the problems associated with improperly discarded gum cuds.

The present invention may be used with a variety of processes for manufacturing chewing gum including batch mixing, continuous mixing and tableted gum processes.

Chewing gum bases of the present invention may be easily prepared by combining the block copolymer with a suitable plasticizer as previously disclosed. If additional ingredients such as softeners, plastic resins, emulsifiers, fillers, colors and antioxidants are desired, they may be added by conventional batch mixing processes or continuous mixing processes. Process temperatures are generally from about 60° C. to about 130° C. in the case of a batch process. If it is desired to combine the plasticized block copolymer with conventional elastomers, it is preferred that the conventional elastomers be formulated into a conventional gum base before combining with the block copolymer gum base. To produce the conventional gum base, the elastomers are first ground or shredded along with filler. Then the ground elastomer is transferred to a batch mixer for compounding. Essentially any standard, commercially available mixer known in the art (e.g., a Sigma blade mixer) may be used for this purpose. The first step of the mixing process is called compounding. Compounding involves combining the ground elastomer with filler and elastomer plasticizer (elastomer solvent). This compounding step generally requires long mixing times (30 to 70 minutes) to produce a homogeneous mixture. After compounding, additional filler and elastomer plasticizer are added followed by PVAc and finally softeners while mixing to homogeneity after each added ingredient. Minor ingredients such as antioxidants and color may be added at any time in the process. The conventional base is then blended with the block copolymer base in the desired ratio. Whether the block copolymer is used alone or in combination with conventional elastomers, the completed base is then extruded or cast into any desirable shape (e.g., pellets, sheets or slabs) and allowed to cool and solidify.

Alternatively, continuous processes using mixing extruders, which are generally known in the art, may be used to prepare the gum base. In a typical continuous mixing process, initial ingredients (including ground elastomer, if used) are metered continuously into extruder ports various points along the length of the extruder corresponding to the batch processing sequence. After the initial ingredients have massed homogeneously and have been sufficiently compounded, the balance of the base ingredients are metered into ports or injected at various points along the length of the extruder. Typically, any remainder of elastomer component or other components are added after the initial compounding stage. The composition is then further processed to produce a homogeneous mass before discharging from the extruder outlet. Typically, the transit time through the extruder will be substantially less than an hour. If the gum base is prepared from block copolymer without conventional elastomers, it may be possible to reduce the necessary length of the extruder needed to produce a homogeneous gum base with a corresponding reduction in transit time. In addition, the block copolymer need not be pre-ground before addition to the extruder. It is only necessary to ensure that the block copolymer is reasonably free-flowing to allow controlled, metered feeding into the extruder inlet port.

Exemplary methods of extrusion, which may optionally be used in conjunction with the present invention, include the following, the entire contents of each being incorporated herein by reference: (i) U.S. Pat. No. 6,238,710, claims a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) yet another U.S. Pat. No. 5,397,580 discloses continuous gum base manufacture wherein two continuous mixers are arranged in series and the blend from the first continuous mixer is continuously added to the second extruder.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first softening or melting the gum base and adding it to the running mixer. The gum base may alternatively be softened or melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about five to about fifteen minutes, although longer mixing times are sometimes required.

In yet another alternative, it may be possible to prepare the gum base and chewing gum in a single high-efficiency extruder as disclosed in U.S. Pat. No. 5,543,160. Chewing gums of the present invention may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer. In the present invention, it may be necessary to first blend the block copolymer with a suitable plasticizer before incorporation of additional gum base or chewing gum ingredients.

This blending and compression process may occur inside the high-efficiency extruder or may be performed externally prior to addition of the plasticized block copolymer composition to the extruder.

Of course, many variations on the basic gum base and chewing gum mixing processes are possible.

After mixing, the chewing gum mass may be formed, for example by rolling or extruding into and desired shape such as sticks, tabs, chunks or pellets. The product may also be filled (for example with a liquid syrup or a powder) and/or coated for example with a hard sugar or polyol coating using known methods.

After forming, and optionally filling and/or coating, the product will typically be packaged in appropriate packaging materials. The purpose of the packaging is to keep the product clean, protect it from environmental elements such as oxygen, moisture and light and to facilitate branding and retail marketing of the product.

EXAMPLES

A commercially available block copolymer which is particularly useful in the present invention is INFUSE™ 9807, a block copolymer having soft blocks which are a random copolymer of polyethylene and hard blocks which are essentially homopolymers of ethylene with possible minor contamination of 1-octene due to process by which the polymer is synthesized. INFUSE™ polymers are manufactured by DOW Chemical Company. INFUSE™ 9807 has the following characteristics:

TABLE 1

| | $Tg_1$ (°C.) | $Tm_1$ (°C.) | $Tg_2$ or $Tm_2$ (°C.) | ODT (°C.) | $G^*$ (MPa) @37° C. | $\delta$ (MPa)$^{1/2}$ $\delta_1$ | $\delta$ (MPa)$^{1/2}$ $\delta_1$ |
|---|---|---|---|---|---|---|---|
| INFUSE™ 9807 | −59 | — | 118 | 86~122 | 1.9 @ 37 C. 0.3 @ 120 C. | <20 | <20 |

Gum bases were prepared from the above polymer according to the formulas of Examples 1-19 in Tables 2-4.

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| INFUSE™ 9807 | 46.98 | 27.98 | 37.98 | 37.98 | 80.00 | 70.00 | 46.98 | 46.97 |
| PVAc (Low MW) | 12.00 | 14.00 | 13.00 | 13.00 | — | — | 12.00 | 15.90 |
| Calcium Carbonate | 13.00 | 18.00 | 15.00 | 15.00 | — | — | 13.00 | — |
| Microcrystalline Wax | 7.00 | 6.00 | 6.00 | 15.00 | 9.00 | — | 7.00 | 9.30 |
| Polyisobutylene (Low MW) | 5.00 | 8.00 | 6.00 | 6.00 | 9.00 | 30.00 | 12.00 | 6.60 |
| Terpene Resin | 7.00 | 11.00 | 9.00 | — | — | — | — | 9.30 |
| Glycerol Monostearate | 1.00 | 2.00 | 2.00 | 2.00 | — | — | 1.00 | 1.30 |
| Hydrogenated Veg. oil | 8.00 | 13.00 | 11.00 | 11.00 | 2.00 | — | 8.00 | 10.60 |
| BHT | 0.02 | 0.02 | 0.02 | 0.02 | — | — | 0.02 | 0.03 |
| Total | 100.00 | 100.00 | 100.00 | 100.00 | 100.00 | 100.00 | 100.00 | 100.00 |

TABLE 3

|  | Ex. 9 | Ex. 10 | Ex. 11 | Ex. 12 | Ex. 13 | Ex. 14 |
|---|---|---|---|---|---|---|
| INFUSE ™ 9807 | 46.98 | 27.98 | 27.97 | 27.98 | 27.98 | 46.98 |
| PVAc (Low MW) | 12.00 | 14.00 | 16.30 | 15.27 | 18.00 | 12.00 |
| Calcium Carbonate | 13.00 | 18.00 | 17.66 | 19.64 | 18.00 | 13.00 |
| Microcrystalline Wax | 7.00 | 6.00 | 9.51 | — | 2.00 | 7.00 |
| Polyisobutylene (Low MW) | 5.00 | 8.00 | 6.79 | 8.73 | 8.00 | 5.00 |
| Terpene Resin | 7.00 | 11.00 | 9.51 | 12.00 | 11.00 | 7.00 |
| Glycerol | 1.00 | 2.00 | 1.36 | 2.18 | 2.00 | 1.00 |

TABLE 3-continued

|  | Ex. 9 | Ex. 10 | Ex. 11 | Ex. 12 | Ex. 13 | Ex. 14 |
|---|---|---|---|---|---|---|
| Monostearate Hydrogenated Veg. oil | 8.00 | 13.00 | 10.87 | 14.18 | 13.00 | 8.00 |
| BHT | 0.02 | 0.02 | 0.03 | 0.02 | 0.02 | 0.02 |
| Total | 100.00 | 100.00 | 100.00 | 100.00 | 100.00 | 100.00 |

TABLE 4

|  | Ex. 15 | Ex. 16 | Ex. 17 | Ex. 18 | Ex. 19 |
|---|---|---|---|---|---|
| INFUSE ™ 9807 | 27.99 | 20.00 | 15.00 | 10.00 | 8.84 |
| PVAc (Low MW) | 15.30 | 16.97 | 18.02 | 19.08 | 24.40 |
| Calcium Carbonate | 19.59 | 21.80 | 23.17 | 24.53 | 21.02 |
| Polyisobutylene (Low MW) | 8.70 | 9.70 | 10.30 | 10.91 | 1.64 |
| Terpene Resin | 12.00 | 13.33 | 14.17 | 15.00 | 22.69 |
| Mono- and di-glycerides | 2.20 | 2.42 | 2.58 | 2.73 | 4.25 |
| Hydrogenated Veg. oil | 14.20 | 15.76 | 16.73 | 17.72 | 13.81 |
| Lecithin | — | — | — | — | 3.29 |
| BHA | 0.02 | 0.02 | 0.03 | 0.03 | 0.06 |
| Total | 100.00 | 100.00 | 100.00 | 100.00 | 100.00 |

Chewing gums (Examples 20-38) were made according to the formulas in Table 5 incorporating The Gum Bases as shown in Table 6.

TABLE 5

|  | A | B |
|---|---|---|
| Sorbitol | 56.86 | 56.86 |
| Base | 33.54 | 33.54 |
| Glycerin | 3.75 | 3.75 |
| Lecithin | — | 1.23 |
| Triacetin | 1.23 | — |
| Acetylated Monoglycerides | 1.23 | 1.23 |
| Peppermint Flavor with Cooling Agents | 2.72 | 2.72 |
| Encapsulated APM | 0.40 | 0.40 |
| Unencapsulated High Intenisity Sweeteners | 0.27 | 0.27 |
| Total | 100.00 | 100.00 |

TABLE 6

| | Example # | | | | | | | | | | | | | | | | | | |
|---|---|---|---|---|---|---|---|---|---|---|---|---|---|---|---|---|---|---|---|
|  | 20 | 21 | 22 | 23 | 24 | 25 | 26 | 27 | 28 | 29 | 30 | 31 | 32 | 33 | 34 | 35 | 36 | 37 | 38 |
| Base Example | 1 | 2 | 3 | 4 | 5 | 6 | 7 | 8 | 9 | 10 | 11 | 12 | 13 | 14 | 15 | 16 | 17 | 18 | 19 |
| Gum Formula | A | A | A | A | A | A | A | A | B | B | B | B | B | B | B | B | B | B | B |

Additional samples were made according to the Formulas in Tables 7 and 8.

TABLE 7

|  | Ex. 39 | Ex. 40 | Ex. 41 | Ex. 42 | CR 43 |
|---|---|---|---|---|---|
| INFUSE 9807 ® | 8.84 | 28.94 | 28.94 | 21.22 | — |
| PVAc (Low MW) | 24.40 | 14.32 | 14.32 | 18.80 | 24.40 |
| Calcium Carbonate | 21.02 | 18.41 | 18.41 | 18.80 | 21.02 |
| Microcrystalline Wax | — | — | — | 2.09 | — |
| Polyisobutylene | 1.64 | 8.18 | 8.18 | 8.36 | 1.64 |
| Terpene Resin | 22.69 | 11.20 | 11.20 | 11.46 | 22.69 |
| Hydrogenated Mono- and Di-Glycerides | 4.25 | 2.05 | — | — | 4.25 |
| Hydrogenated Veg. Oil | 13.81 | 13.30 | 15.35 | 15.67 | 13.81 |
| Lecithin | 3.29 | 3.54 | 3.54 | 3.54 | 3.29 |
| Butyl Rubber | — | — | — | — | 8.84 |
| BHA | 0.06 | 0.06 | 0.06 | 0.06 | 0.06 |
| Total | 100.00 | 100.00 | 100.00 | 100.00 | 100.00 |

TABLE 8

|  | Ex. 44 | Ex. 45 | Ex. 46 | C.R. 47 |
|---|---|---|---|---|
| STL-M | 56.86 | 56.86 | 58.09 | 47.86 |
| Gum Base of Ex. 41 | 33.54 | 34.77 | 34.77 | — |
| Gum Base of C.R. 43 | — | — | — | 31.00 |
| Calcium Carbonate | — | — | — | 14.00 |
| Triacetin | 1.23 | — | — | — |
| Glycerin | 3.75 | 3.75 | 3.75 | 3.75 |
| Acetylated Monoglycerides | 1.23 | 1.23 | — | — |
| Lecithin | — | 1.23 | — | — |

TABLE 8-continued

|  | Ex. 44 | Ex. 45 | Ex. 46 | C.R. 47 |
|---|---|---|---|---|
| Flavor | 2.72 | 2.72 | 2.72 | 2.72 |
| Encapsulated and Free High Intensity Sweeteners | 0.67 | 0.67 | 0.67 | 0.67 |
| total | 100.00 | 100.00 | 100.00 | 100.00 |

TABLE 9

|  | Ex. 48 | Ex. 49 | Ex. 50 | Ex. 51 | Ex. 52 | Ex. 53 |
|---|---|---|---|---|---|---|
| INFUSE ™ 9807 | 9.29 | 9.75 | 24.99 | 2.00 | — | — |
| INFUSE ™ 9817 | — | — | — | 8.84 | 10.84 | — |
| INFUSE ™ 9507 | — | — | — | — | — | 9.03 |
| Polyisobutylene | 1.72 | 1.80 | 7.07 | 1.64 | 1.64 | 1.67 |
| PVAc (Low MW) | 25.64 | 26.92 | 12.38 | 24.41 | 24.40 | 24.92 |
| Calcium Carbonate | 22.09 | 23.19 | 15.90 | 21.03 | 21.01 | 21.55 |
| Terpene Resin | 23.84 | 25.02 | 29.02 | 22.68 | 22.69 | 23.17 |
| Fully and Partially Hydrogenated Veg. Oil | 13.90 | 9.63 | — | 13.22 | 11.23 | 8.24 |
| Microcrystalline Wax | — | — | — | 2.83 | 4.84 | — |
| Paraffin | — | — | — | — | — | 8.00 |
| Lecithin | 3.46 | 3.63 | 3.06 | 3.29 | 3.29 | 3.36 |
| BHA | 0.06 | 0.06 | 0.06 | 0.06 | 0.06 | 0.06 |
| Total | 100.00 | 100.00 | 100.00 | 100.00 | 100.00 | 100.00 |

TABLE 10

|  | Ex. 54 | Ex. 55 | Ex. 56 | Ex. 57 | Ex. 58 | Ex. 59 | Ex. 54 |
|---|---|---|---|---|---|---|---|
| Sorbitol | 58.09 | 58.09 | 47.86 | 58.09 | 58.09 | 58.09 | 46.86 |
| Xylitol | — | — | — | — | — | — | 12.00 |
| Ex. 48 | 34.77 | — | 31.00 | — | — | — | — |
| Ex. 49 | — | 34.77 | — | — | — | — | — |
| Ex. 50 | — | — | — | 34.77 | — | — | — |
| Ex. 51 | — | — | — | — | 34.77 | — | — |
| Ex. 52 | — | — | — | — | — | 34.77 | — |
| Ex. 53 | — | — | — | — | — | — | 34.00 |
| Calcium Carbonate | — | — | 14.00 | — | — | — | — |
| Glycerin 99% | 3.75 | 3.75 | 3.75 | 3.75 | 3.75 | 3.75 | 3.75 |
| Free and Spray Dried Flavor | 2.72 | 2.72 | 2.72 | 2.72 | 2.72 | 2.72 | 2.72 |
| Free and Encapsulated High Intensity Sweeteners | 0.67 | 0.67 | 0.67 | 0.67 | 0.67 | 0.67 | 0.67 |
| Total | 100.00 | 100.00 | 100.00 | 100.00 | 100.00 | 100.00 | 100.00 |

DSC thermographs performed on the INFUSE™ polymer, representative gum bases and the chewed cuds thereof indicated the crystalline hard block structure is preserved in both base and gum cud. See FIG. 2

Removability tests were performed on the chewing gums of Examples 20 and 21. Gum cuds were prepared by chewing the gum for 20 minutes. The gum cuds were placed on a paver stone and immediately stepped on to adhere the cud to the stone. After two hours, the paver with cud attached was subjected to 199 footsteps. The stones were aged at room temperature for 24 hours. A pair of pliers was then used to remove the cuds. In all cases the cud was completely removed with no visible residue. It was found that the cuds were also easily removed by sweeping by broom or by grasping with fingers.

Figure 8:
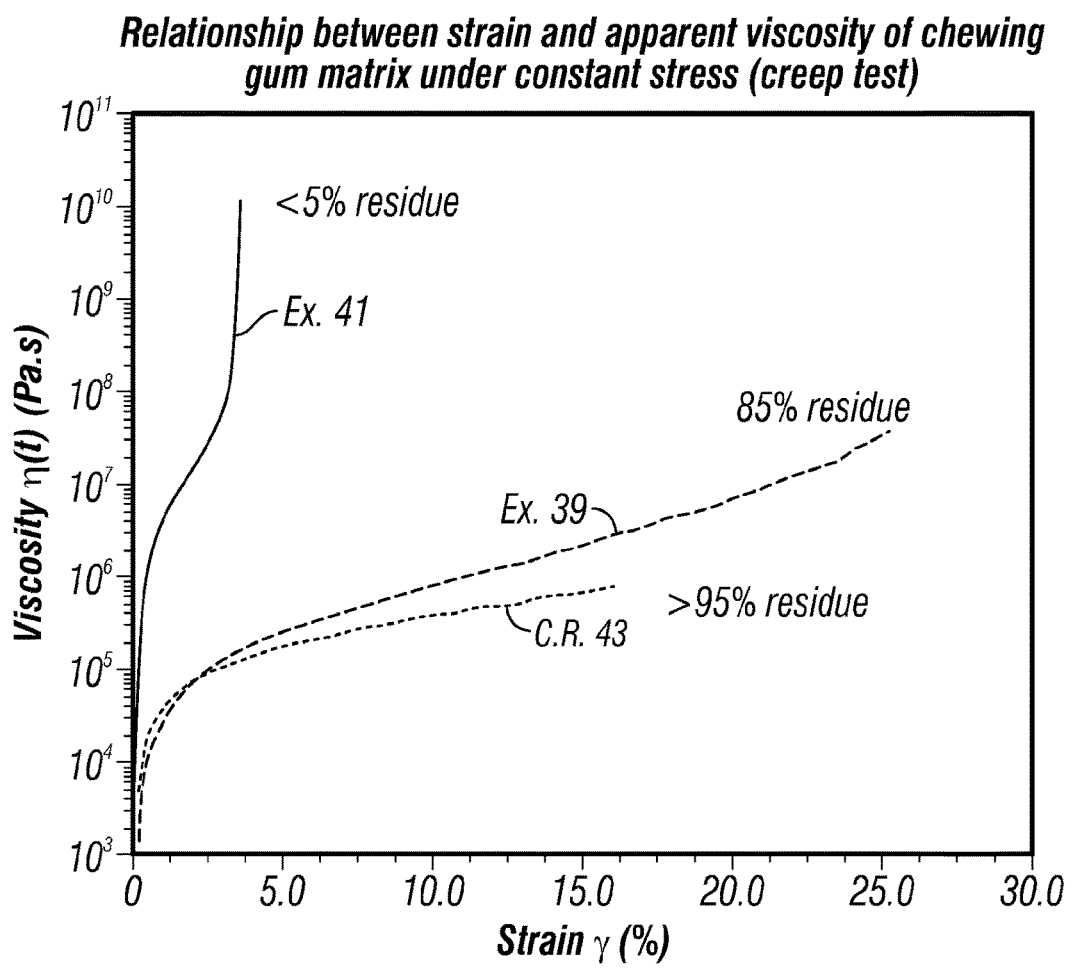
FIG. 8 is a graph showing the relationship between strain and apparent viscosity of chewing gum matrix under constant stress (creep test)

Removability tests were performed on cuds produced from Ex. Examples 39 and 41 and Comparative Run 43 by chewing them for 20 minutes, applying the cuds to paver stones, stepping on the cuds 199 times, aging the adhered cuds for 24 hours and then attempting to remove them with a mechanical grabber. Residue remaining after removal attempts was 85%, less than 5% and more than 95% respectively for the three samples. This demonstrates that a minimum concentration of the block copolymer is necessary for good removability. When the volume concentration of crystalline joints in the cud is sufficiently high, as in Example 41, the cud will behave as a viscoelastic solid as shown in FIG. 8. If the volume concentration of crystalline joints in the cud is too low, as in Example 39, the cud will behave as a viscoelastic liquid which is typical of conventional gum bases such as C.R. 43. More specifically, bases with a sufficient density of crystalline joints will be capable of forming a viscoelastic solid cud having a sheer viscosity having a sheer viscosity of at least $10^6$ Pa or at least $10^7$ Pa or even $10^8$ Pa at no more than 4% strain when subjected to stress in the 100 to 400 Pa range. Creep test results for the three samples are shown in FIG. 8.

The creep test was run on gum cuds chewed for 20 minutes using a Discovery HR-2 (TA Instruments) rheometer in creep mode. The sample dimensions were 1 mm×20 mm. The instrument was set as follows: Frequency=0.1~100 rad/s, Stress=40-400 Pa, DURATION=180-3600 sec.

What is claimed is:

1. A chewing gum comprising a sweetener, a flavoring agent and a chewing gum base comprising a block copolymer comprising at least one soft polymeric block and at least two hard, crystallizable polymeric blocks, wherein the hard, crystallizable polymeric blocks have a melting point greater than 20° C. and wherein the polymeric blocks each have a degree of polymerization of at least 15 and wherein the at least one soft block comprises a random copolymer of 1-octene and ethylene and wherein the at least two hard blocks comprise a polymer that is essentially an ethylene homopolymer.

2. The chewing gum of claim 1 wherein the hard crystallizable blocks comprise greater than 30% by molar fraction.

3. The chewing gum of claim 1 wherein the number average molecular weight of the block copolymer is between 26,000 and 250,000 g/mole.

4. The chewing gum of claim 1 wherein the block copolymer comprises 5 to 100% by weight of the gum base.

5. The chewing gum of claim 1 wherein the block copolymer comprises 10 to 50% by weight of the gum base.

6. The chewing gum of claim 1 wherein the block copolymer comprises a multi-block copolymer comprising at least two repeating sequences of at least two different polymeric blocks.

7. The chewing gum of claim 6 wherein the multi-block copolymer comprises a repeating sequence of exactly two different polymeric blocks.

8. The chewing gum of claim 6 wherein the multi-block copolymer comprises at least three repeating sequences.

9. The chewing gum of claim 1 wherein the chewing gum, upon being chewed and discarded, forms a cud comprising microcrystalline joints having a size of from 0.01 microns to 100 microns.

10. The chewing gum of claim 9 wherein the microcrystalline joints have a size of from 0.03 microns to 1 micron.

11. The chewing gum of claim 9 wherein the melting point of the microcrystalline joint is at least 25° C.

12. The chewing gum of claim 9 wherein the melting point of the microcrystalline joint is less than 80° C.

13. The chewing gum of claim 9 wherein the cud comprises at least 0.5% of microcrystalline joints by weight of the cud.

14. The chewing gum of claim 1 wherein the hard blocks are essentially homopolymers of ethylene with minor contamination of 1-octene.

* * * * *